United States Patent
Klement et al.

(10) Patent No.: US 7,304,411 B2
(45) Date of Patent: Dec. 4, 2007

(54) METHOD AND APPARATUS FOR REDUCING Q FACTOR IN AN OSCILLATING LASER SCANNER

(75) Inventors: Martin Christopher Klement, Lexington, KY (US); Daniel Eugene Pawley, Louisville, KY (US)

(73) Assignee: Lexmark International, Inc., Lexington, KY (US)

( * ) Notice: Subject to any disclaimer, the term of this patent is extended or adjusted under 35 U.S.C. 154(b) by 569 days.

(21) Appl. No.: 11/007,723

(22) Filed: Dec. 7, 2004

(65) Prior Publication Data

US 2005/0093964 A1 May 5, 2005

Related U.S. Application Data

(63) Continuation-in-part of application No. 10/689,175, filed on Oct. 20, 2003, now Pat. No. 6,794,794.

(51) Int. Cl.
*H01L 41/08* (2006.01)
(52) U.S. Cl. .................................................. 310/311
(58) Field of Classification Search ................ 310/311, 310/312, 322
See application file for complete search history.

(56) References Cited

U.S. PATENT DOCUMENTS

| | | | |
|---|---|---|---|
| 3,803,637 A | 4/1974 | Martin et al. |
| 4,032,888 A | 6/1977 | Broyles et al. |
| 4,037,231 A | 7/1977 | Broyles et al. |
| 4,317,611 A | 3/1982 | Petersen |
| 4,344,677 A | 8/1982 | Stuermer et al. |
| 4,418,567 A | 12/1983 | Boning et al. |
| 4,630,223 A | 12/1986 | Schoon |
| 4,762,994 A | 8/1988 | Byerly et al. |
| 5,157,650 A | 10/1992 | Ozue et al. |
| 5,543,956 A | 8/1996 | Nakagawa et al. |
| 5,606,447 A | 2/1997 | Asada et al. |
| 5,629,790 A | 5/1997 | Neukermans et al. |
| 5,745,294 A | 4/1998 | Kudo |

(Continued)

OTHER PUBLICATIONS

Texas Instruments Product Review, Multi-topology Piezoelectric Transformer Controller, Nov. 2001, p. 1-27 and page headed "Important Notice".

*Primary Examiner*—Mark Budd
(74) *Attorney, Agent, or Firm*—Luedeka, Neely & Graham, P.C.

(57) ABSTRACT

A method reduces the Q factor of the resonant frequency response of a torsional oscillator system in a laser printer, where the Q factor is expressed as a function of the resonant frequency and 3 dB bandwidth of the frequency response. The frequency response of the torsional oscillator system is a function of at least a rotational inertia, a spring constant and a damping constant. The method includes the steps of decreasing the rotational inertia of the torsional oscillator system by a first factor, and decreasing the spring constant by a second factor that is substantially equal to the first factor. The method generally increases component yields, thereby reducing component costs. Also, laser printers using torsion oscillators having reduced Q factors may be used over a wider speed range. Conversely, a single laser printer model may be used at a single speed, rather than at speeds that vary due to variations in resonant frequency. The method also provides for greater freedom of movement of the operating point of the printer during printer development.

8 Claims, 3 Drawing Sheets

U.S. PATENT DOCUMENTS

| | | |
|---|---|---|
| 5,767,666 A | 6/1998 | Asada et al. |
| 5,841,553 A | 11/1998 | Neukermans |
| 5,880,765 A | 3/1999 | Ueda et al. |
| 5,953,103 A | 9/1999 | Nakamura |
| 5,959,760 A | 9/1999 | Yamada et al. |
| 6,069,727 A | 5/2000 | Cho et al. |
| 6,285,383 B1 | 9/2001 | Klement et al. |
| 6,295,154 B1 | 9/2001 | Laor et al. |
| 6,411,321 B2 | 6/2002 | Tanimoto et al. |

METHOD AND APPARATUS FOR REDUCING Q FACTOR IN AN OSCILLATING LASER SCANNER

This application is a continuation-in-part of U.S. patent application Ser. No. 10/689,175, filed Oct. 20, 2003, now U.S. Pat. No. 6,794,794 entitled BI-DIRECTIONAL GALVONOMETRIC SCANNING AND IMAGING.

BACKGROUND OF THE INVENTION

The invention relates generally to optical systems used in laser printers. More particularly, the invention relates to adjusting the resonant characteristics of a torsion oscillator mirror.

Torsion oscillators with a mirrored surface are used in laser printers to scan a laser beam bi-directionally across a laser printer drum. Generally, the scan angle of the mirrored surface of the torsion oscillator varies sinusoidally with respect to time. The reflective element, or mirror, of the torsion oscillator is typically attached by elastic members to a rigid supporting mount. The elastic members suspend the mirror while allowing it to rotate over a limited range along a single axis. The elastic members act as a torsional spring, and together with the mass of the attached mirror, form a torsional spring-mass oscillator. A means of exciting oscillation is provided to the device, typically in the form of an electromagnetic drive current having alternating polarity.

The construction of a torsion oscillator determines its basic operating characteristics, such as resonant frequency ($F_r$), operating scan angle, resonant frequency drift with temperature, and the amount of power required to drive the oscillator to a desired scan angle while operating near or far from resonance. Since a torsion oscillator typically forms a highly efficient resonant system, it is necessary to drive the device with a driving frequency very near resonance. Otherwise, its scan amplitude becomes difficult to maintain at a constant level with feedback control and reasonable amounts of drive power.

Typical torsion oscillators have a relatively high Q, which results in a useful drive frequency range much narrower than the distribution of nominal resonant frequencies of "identical" units produced with reasonable manufacturing tolerances. For example, a typical adevice might have a useful drive frequency range of ±0.5% of the nominal resonant frequency. However, the expected distribution of frequencies from a sampling of units manufactured according to a single design might be ±10% of the nominal design resonant frequency. As a result, each system using a torsion oscillator must be adapted or custom tailored for that particular device's usable frequency range.

What is needed, therefore, is a torsion oscillator having a larger usable frequency range, so that the detrimental effects of device-to-device resonant frequency variations are minimized.

SUMMARY OF THE INVENTION

In one aspect, the invention provides a method for reducing the Q factor of the resonant frequency response of a torsional oscillator system in a laser printer, where the Q factor is expressed as a function of the resonant frequency and 3 dB bandwidth of the frequency response. The frequency response of the torsional oscillator system is a function of at least a rotational inertia, a spring constant and a damping constant. The method includes the steps of decreasing the rotational inertia of the torsional oscillator system by a first factor, and decreasing the spring constant by a second factor that is substantially equal to the first factor. In preferred embodiments of the invention, the method also includes maintaining the damping constant at a substantially unchanged value and maintaining the resonant frequency at a substantially unchanged value.

The method of the invention generally increases component yields, thereby reducing component costs. Also, a laser printer using a torsion oscillator having a Q value that is reduced according to the invention may be used over a wider speed range. Conversely, a single laser printer model may be used at a single speed, rather than at speeds that vary slightly due to variations in resonant frequency. The invention also provides for greater freedom of movement of the printer operating point during printer development.

In another aspect, the invention provides a method for reducing the Q factor of the resonant frequency response of a torsional oscillator system in a laser printer, where the torsional oscillator system has a mirror suspended by one or more elastic members. The Q factor is expressed according to $$Q = \frac{F_r}{BW_{-3dB}},$$

where $F_r$ is the resonant frequency of the frequency response and $BW_{-3dB}$ is the 3 dB bandwidth 60 of the frequency response of the torsional oscillator system. It will be appreciated that in a mechanical system, the −3 dB point represents a 50% reduction in amplitude. It also represents the point at which power must be increased by up to a factor of two to maintain a constant amplitude. The frequency response is expressed according to $$P(s) = \frac{1}{Js^2 + Cs + K},$$

where J is the rotational inertia, K is the spring constant and C is the damping constant of the torsional oscillator system. According to the invention, the method includes decreasing the mass of the mirror to decrease the rotational inertia, J, of the torsional oscillator system by a first factor. The method also includes decreasing the stiffness of the elastic members to decrease the spring constant, K, by a second factor that is substantially equal to the first factor.

In some preferred embodiments, the method includes decreasing the mass of the mirror so that the rotational inertia, J, is decreased by up to about 50 percent, and decreasing the stiffness of the elastic members so that the spring constant, K, is decreased by up to about 50 percent. Preferably, the damping constant, C, and the resonant frequency, $F_r$, are substantially unchanged.

DETAILED DESCRIPTION

Prior patent applications assigned to the assignee of the present invention have described the construction and operation of the torsion oscillator, including the placement of coil(s) and magnet(s) that together create rotational movement when electrical drive power is applied to the coil. These prior applications include U.S. patent application Ser. Nos. 10/093,754, filed Mar. 8, 2002, (published as No. US 2003-0169055 A1 on Sep. 11, 2003); Ser. No. 10/329,084, filed Oct. 23, 2002, (published as No. US 2004-0119813 A1 on Jun. 24, 2004); and Ser. No. 10/689,175, filed Oct. 20, 2003, (published as No. US 2004-0125198 A1 on Jul. 1, 2004), the entire contents of which are hereby expressly incorporated by reference.

Figure 1:
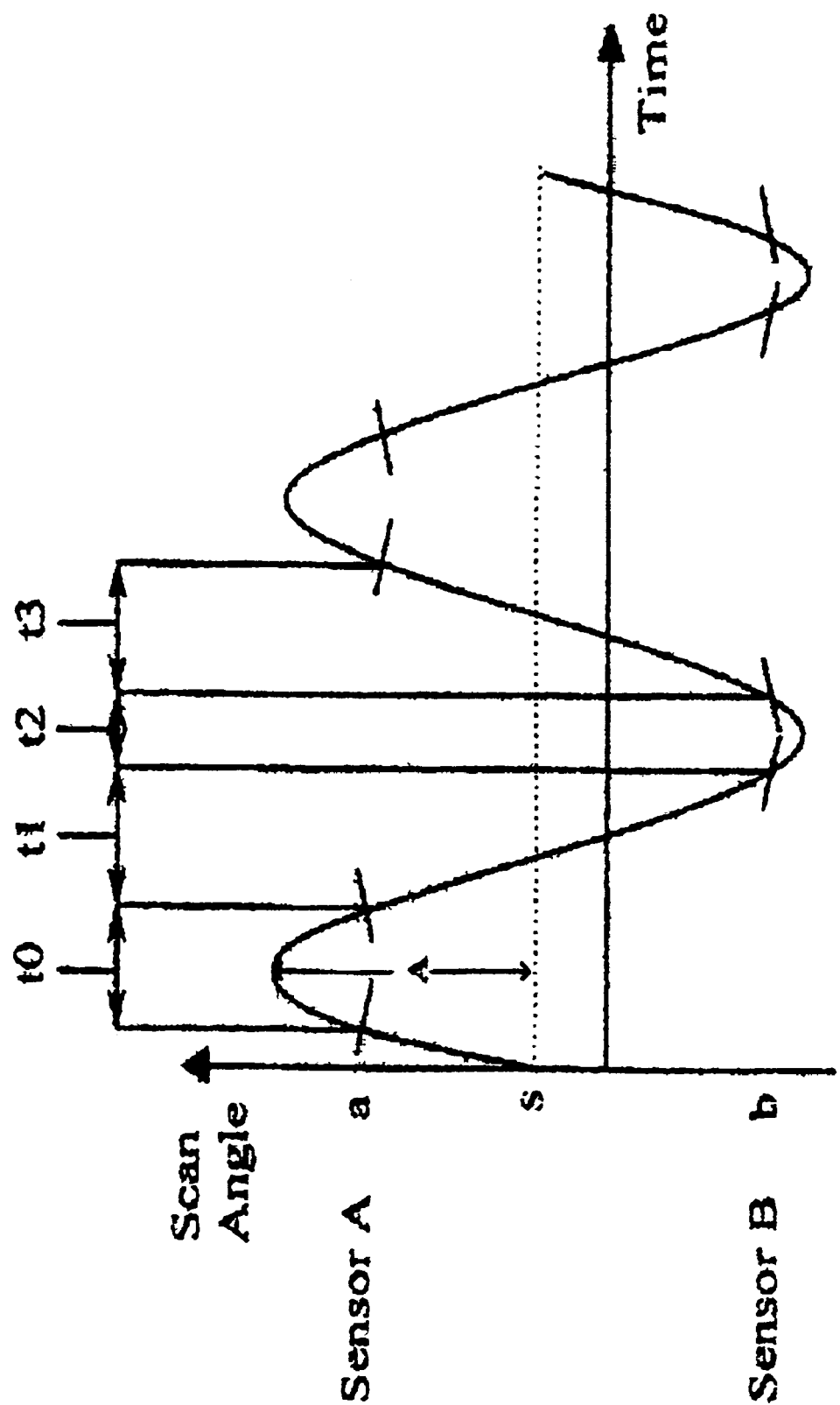
FIG. 1 depicts a plot of scan angle as a function of time for a torsion oscillator scanning mirror.

Generally, the motion of a torsion oscillator is controlled by characteristics of the electrical drive power supplied to it. The typical output scan angle versus time of laser light reflected from the mirrored surface of a torsion oscillator is depicted in FIG. 1. The plot of FIG. 1 shows the output scan angle relative to an image surface, such as the surface of a photoconductor in a laser printer, without any optical correction. One or more of the previous disclosures listed above describe the use of optical sensors at the extremes of the scan angle, such as at points a and b in FIG. 1, to insure that the printing on the photoconductor surface occurs only in regions t1 and t3 of the scan where the rate of change of the scan angle is nearly linear.

A torsion oscillator may be modeled as a second order, single degree of freedom mechanical system having a frequency response expressed according to:

$$P(s) = \frac{1}{Js^2 + Cs + K}, \tag{1}$$

where s is the frequency in radians/second. This model includes lumped elements of rotational inertia (J), damping (C), and spring constant (K). The rotational inertia (J) is dominated by the mass of the mirror. The damping (C) is mostly due to resistance of air against which the mirror moves as it scans. The spring constant (K) is related to the stiffness of the elastic members from which the mirror is suspended.

Figure 2:
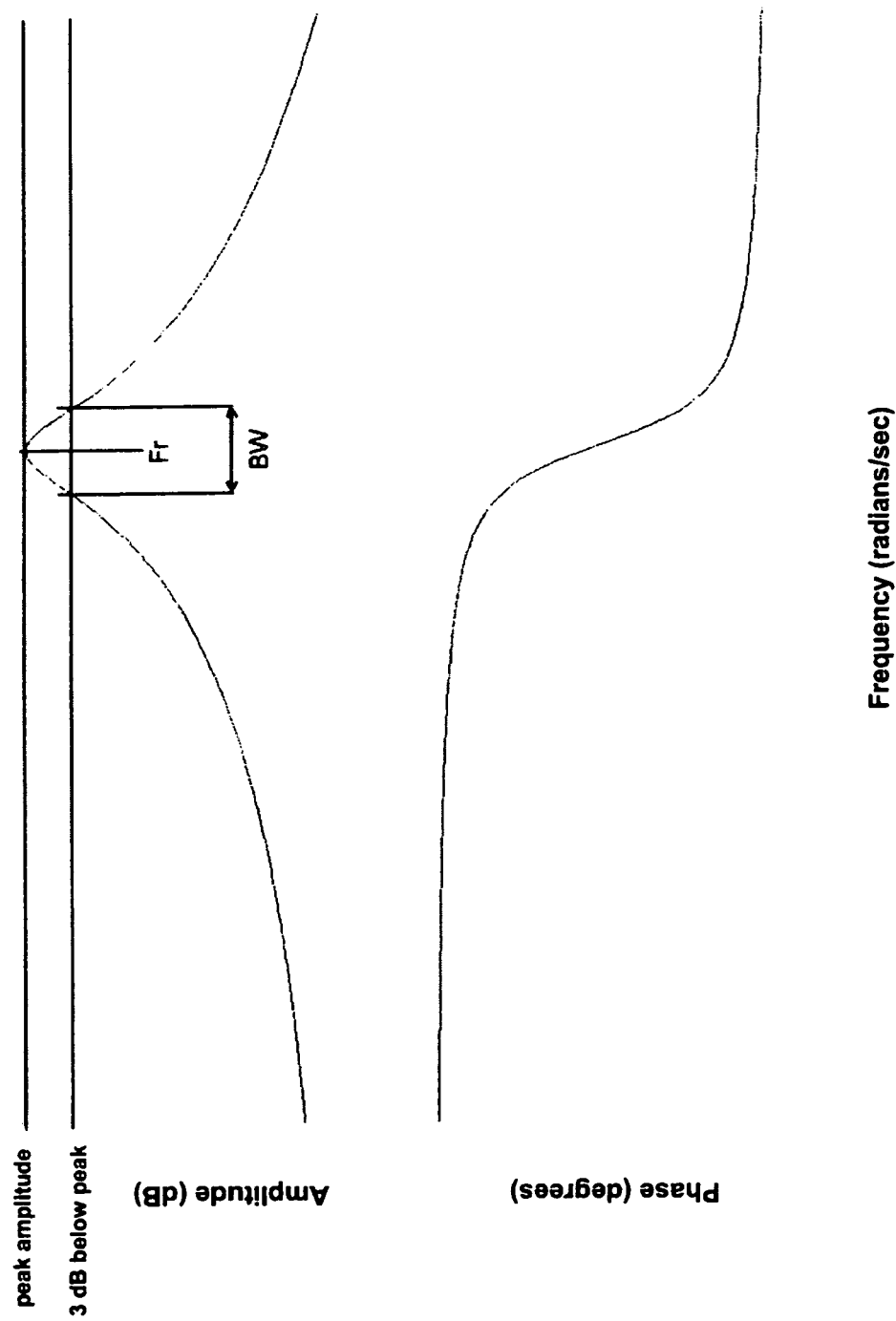
FIG. 2 depicts a typical frequency response of a torsion oscillator.

FIG. 2 depicts a Bode diagram of a typical torsion oscillator system having the frequency response of equation (1). The resonant frequency of the system, $F_r$, is the frequency of peak output magnitude. The −3 dB bandwidth, $BW_{-3dB}$, is the width of the frequency response curve at a level that is 3 dB below the peak output magnitude.

The main characteristic dictating the useful operating frequency range of a torsion oscillator system is the Q factor, which may be expressed as:

$$Q = \frac{F_r}{BW_{-3dB}}. \tag{2}$$

A high Q indicates that the bandwidth of the system is small relative to the resonant frequency. In a high Q system, the frequency response drops off rapidly when the system is driven away from resonance. The frequency response of a low Q system has a flatter peak at the resonant frequency and does not drop off as steeply, indicating that useful output can be obtained farther away from resonance.

Table I indicates how changes in the lumped parameters of rotational inertia (J), damping (C), and spring constant (K) generally affect the resonant frequency, $F_r$, the −3 dB bandwidth, $BW_{-3dB}$, the Q factor and the peak amplitude of the frequency response.

TABLE I

| Parameter Change | $BW_{-3\ dB}$ | $F_r$ | Q | Peak Amplitude |
|---|---|---|---|---|
| Increase J only | Decrease | Decrease | Decrease | Increase |
| Increase K only | Decrease | Increase | Increase | Decrease |
| Increase C only | Increase | Unchanged | Decrease | Decrease |
| Increase K and J equally | Decrease | Unchanged | Increase | Unchanged |
| Decrease K and J equally | Increase | Unchanged | Decrease | Unchanged |

Changes in the lumped parameters (J, K, C) as indicated in Table I may be accomplished by appropriate modifications in the design of the torsion oscillator. For example, the rotational inertia, J, may be increased by increasing the mass of the mirror, such as by making the mirror wider. The spring constant, K, may be increased by stiffening the elastic members from which the mirror is suspended. It should be noted that in Table I, the notation of an "unchanged" characteristic indicates that the change is very small or nearly zero compared to others, not that there is absolutely zero change.

Although increased damping produces a strong reduction in Q, air resistance is the most significant component of damping in a torsion oscillator system. Increasing the mirror area is one of the few design options available to increase damping through increased air resistance. However, this change is not easily implemented without also increasing the rotational inertia, which substantially negates the benefit of the increased damping. Similarly, changes in torsional stiffness alone will affect all performance characteristics, not just the desired changes in Q and $BW_{-3dB}$.

Figure 3:
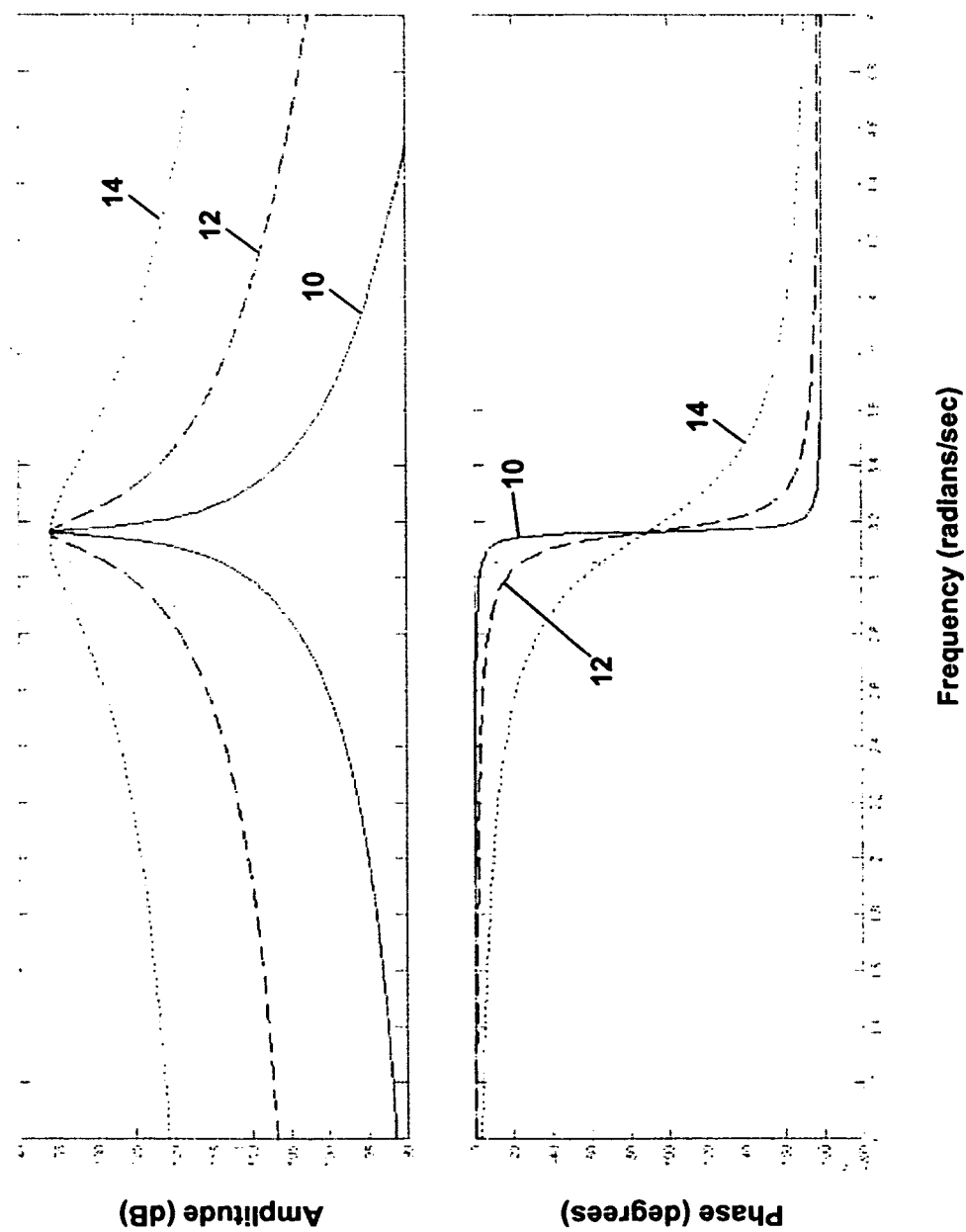
FIG. 3 depicts frequency responses of torsion oscillators with Q values decreased according to a preferred embodiment of the invention.

According to the invention, Q is decreased by decreasing both rotational inertia, J, and torsional stiffness, K, equally. This approach directly affects the desired parameters, Q and $BW_{-3dB}$, while leaving other characteristics relatively unchanged. FIG. 3 depicts how equal reductions in rotational inertia and torsional stiffness result in a lower Q, and thus a wider operating bandwidth, without changing the resonant frequency. The curve 10 of FIG. 3 corresponds to the frequency response of the torsion oscillator system modeled according to equation (1). The curve 12 corresponds to the frequency response of the torsion oscillator system modeled according to:

$$P(s) = \frac{1}{0.17Js^2 + Cs + 0.17K}, \tag{3}$$

where J and K are both reduced by 83% relative to their values in equation (1). The curve 14 corresponds to the frequency response of the torsion oscillator system modeled according to:

$$P(s) = \frac{1}{0.033Js^2 + Cs + 0.033K}. \tag{4}$$

where J and K are both reduced by 96.7% relative to their values in equation (1).

Generally, torsion oscillators used in laser printers have a resonant frequency near 2000 Hz, resulting in a bandwidth of about 5 Hz and a Q near 400. Any decrease in Q, with the accompanying increase in bandwidth, will provide benefits for certain applications as previously described. According to the present invention, an equal reduction in both rotational inertia and torsional stiffness decreases Q and increases bandwidth a proportional amount. For example, consider a system initially having a bandwidth of 5 Hz and a Q of 400. Applying the method of the invention, a reasonable 50% reduction of the J and K parameters in equation (1) results in a 100% increase in bandwidth to 10 Hz and 50% reduction of Q to 200. With the damping parameter C remaining substantially unchanged in the process, the resonant frequency and peak amplitude response magnitude remain substantially the same.

When implementing the present invention to reduce the Q value for a torsional oscillator, it should be appreciated that low Q devices require a drive signal with low harmonic content for jitter free printing. Also, low Q devices generally require more energy to drive at resonance. However, the amount of power needed to drive a low Q device off resonance is less than that needed for a high Q device.

A low Q device as provided by the present invention may be driven with a non-sinusoidal periodic waveform. In this manner, the scan velocity can be shaped according to a desired profile, rather than having to compensate for the changes in scan velocity inherent in the sinusoidal scan provided by a high Q device.

While specific embodiments of the invention have been illustrated and described herein, it is realized that numerous modifications and changes will occur to those skilled in the art. It is therefore to be understood that the appended claims are intended to cover all such modifications and changes as follow in the true spirit and scope of the invention.

The invention claimed is:

1. A method for reducing a Q factor of a resonant frequency response of a torsional oscillator system in a laser printer, where the Q factor is expressed as a function of a resonant frequency and a minus three decibel bandwidth of the frequency response, and where the frequency response of the torsional oscillator system is a function of at least a rotational inertia, a spring constant and a damping constant, the method comprising:
  (a) decreasing the rotational inertia of the torsional oscillator system by a first factor; and
  (b) decreasing the spring constant by a second factor that is substantially equal to the first factor.

2. The method of claim 1 further comprising the step of (c) maintaining the damping constant at a substantially unchanged value.

3. The method of claim 1 further comprising the step of (c) maintaining the resonant frequency at a substantially unchanged value.

4. A method for reducing the Q factor of a resonant frequency response of a torsional oscillator system having a mirror suspended by one or more elastic members, where the Q factor is expressed according to $$Q = \frac{F_r}{BW_{-3dB}},$$

where $F_r$ is the resonant frequency of the frequency response and $BW_{-3dB}$ is the minus three decibel bandwidth of the frequency response of the torsional oscillator system, and where the frequency response is expressed according to $$P(s) = \frac{1}{Js^2 + Cs + K},$$

where J is a rotational inertia, K is a spring constant and C is a damping constant of the torsional oscillator system, the method comprising:
  (a) decreasing the mass of the mirror to decrease the rotational inertia, J, of the torsional oscillator system by a first factor; and
  (b) decreasing the stiffness of at least one of the one or more elastic members to decrease the spring constant, K, by a second factor that is substantially equal to the first factor.

5. The method of claim 4 further comprising the step of (c) maintaining the damping constant, C, at a substantially unchanged value.

6. The method of claim 4 further comprising the step of (c) maintaining the resonant frequency, $F_r$, at a substantially unchanged value.

7. A method for reducing a Q factor of a resonant frequency response of a torsional oscillator system in a laser printer, where the Q factor is expressed as a function of a resonant frequency and a minus three decibel bandwidth of the frequency response, and where the frequency response of the torsional oscillator system is a function of at least a rotational inertia, a spring constant and a damping constant, the method comprising:
  (a) decreasing the rotational inertia of the torsional oscillator system by a first factor;
  (b) decreasing the spring constant by a second factor that is substantially equal to the first factor;
  (c) maintaining the damping constant at a substantially unchanged value; and
  (d) maintaining the resonant frequency at a substantially unchanged value.

8. A method for reducing the Q factor of a resonant frequency response of a torsional oscillator system in a laser printer, where the torsional oscillator system has a mirror suspended by one or more elastic members, where the Q factor is expressed according to $$Q = \frac{F_r}{BW_{-3dB}},$$

where $F_r$ is the resonant frequency of the frequency response and $BW_{-3dB}$ is the minus three decibel bandwidth of the frequency response of the torsional oscillator system, and where the frequency response is expressed according to $$P(s) = \frac{1}{Js^2 + Cs + K},$$

where J is a rotational inertia, K is a spring constant and C is a damping constant of the torsional oscillator system, the method comprising:

(a) decreasing the mass of the mirror to decrease the rotational inertia, J, of the torsional oscillator system by a first factor;

(b) decreasing the stiffness of at least one of the one or more elastic members to decrease the spring constant, K, by a second factor that is substantially equal to the first factor;

(c) maintaining the damping constant, C, at a substantially unchanged value; and (d) maintaining the resonant frequency, $F_r$, at a substantially unchanged value.

* * * * *